United States Patent [19]

Fukuda et al.

[11] Patent Number: 5,281,994
[45] Date of Patent: Jan. 25, 1994

[54] MIRROR-HOLDING DEVICE

[75] Inventors: Hideo Fukuda; Hiroyuki Sakamoto; Naruyuki Miyamoto; Ichirou Takahashi, all of Osaka, Japan

[73] Assignee: Mita Industrial Co., Ltd., Osaka, Japan

[21] Appl. No.: 782,366

[22] Filed: Oct. 24, 1991

[30] Foreign Application Priority Data

Oct. 30, 1990 [JP] Japan .................. 2-114214[U]
Nov. 17, 1990 [JP] Japan ................... 2-312188
Nov. 30, 1990 [JP] Japan ................... 2-339480

[51] Int. Cl.⁵ .................................. G03B 27/70
[52] U.S. Cl. ....................... 355/66; 355/60; 355/67
[58] Field of Search ............... 355/236, 60, 66, 67

[56] References Cited

U.S. PATENT DOCUMENTS 4,401,384  8/1983  Abe ........................ 355/66

Primary Examiner—Monroe H. Hayes
Attorney, Agent, or Firm—Wenderoth, Lind & Ponack

[57] ABSTRACT

Opposite surfaces or sides of a mirror in an optical system are supported in a spring-biased manner at three points in total. This prevents a shift in position of the mirror that otherwise might occur due to shocks during reciprocal movement of the optical system.

38 Claims, 9 Drawing Sheets

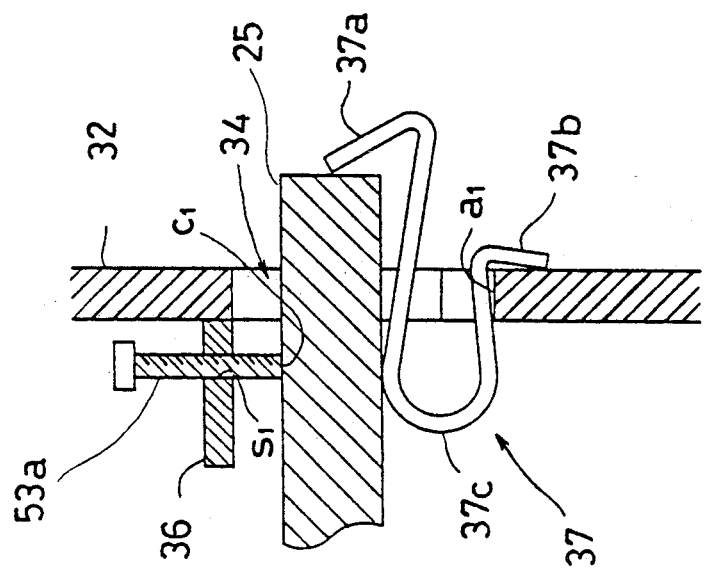
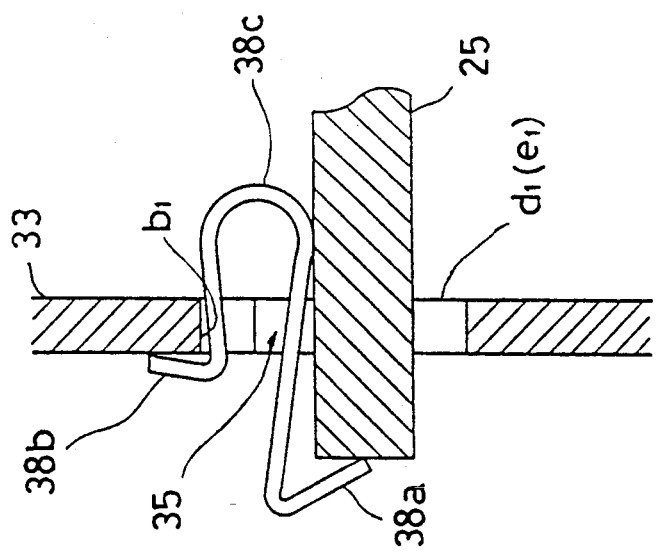

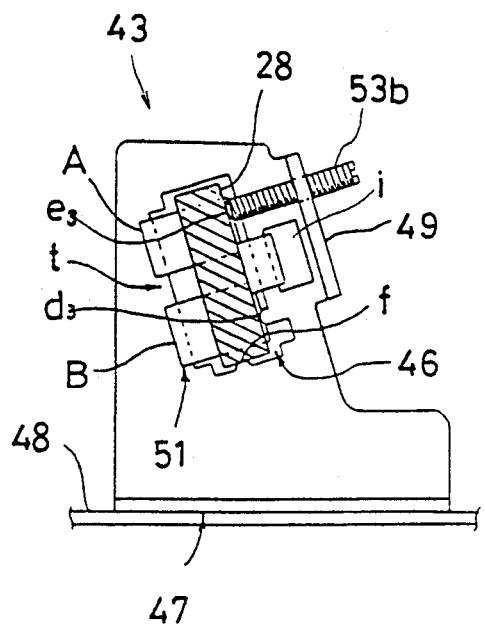
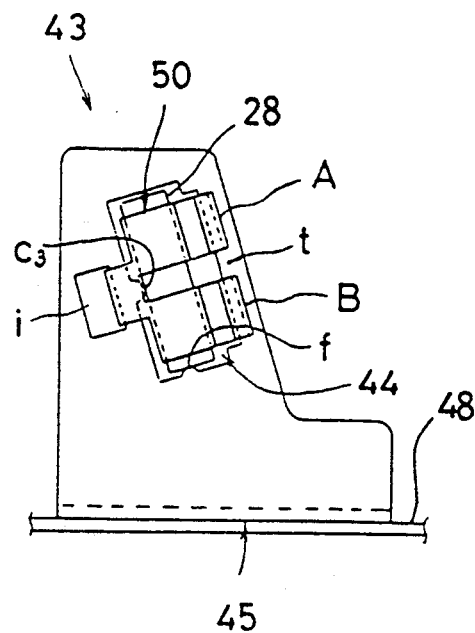
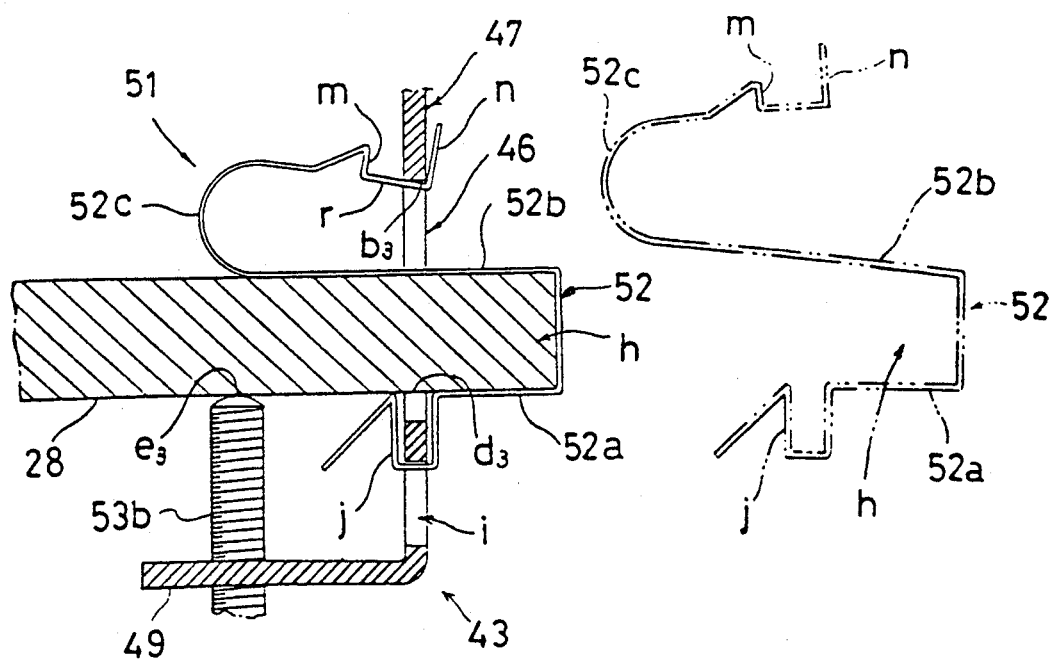

MIRROR-HOLDING DEVICE

BACKGROUND OF THE INVENTION

1. Field of the Invention

The present invention relates to a mirror holding device in a manuscript scanning apparatus adapted to guide a manuscript image through a mirror to an image receptor of a reading element, such as a surface of a photoreceptor or CCD and the like.

2. Description of the Prior Art

A so-called cantilever rod support type manuscript scanning apparatus has been known for use in optical system movement type copying machines and the like. In such manuscript scanning apparatus, a guide rail and a guide rod are spaced provided at a predetermined interval and extend in a scanning direction. First and second movable frame members each have at one end thereof a respective sliding member that is slidably supported on the guide rail. The opposite end side of each movable frame member is slidably engaged with the guide rod. The first movable frame is provided with an optical element comprising a light source for radiating a manuscript surface on a contact glass and a first mirror. The second movable frame member is provided with an optical element comprising second and third mirrors aligned at a second right angle for twice reflecting light reflected by the first mirror. A fixed fourth mirror is provided for reflecting a light reflected by the third mirror and then transmitting through an image forming lens unit toward the surface of the photoreceptor.

In such manuscript scanning apparatus, a first holding member holding one end of each mirror is provided with a first projection for supporting a mirror surface at one point midway in a direction of width thereof. A second holding member holding the opposite end of each mirror is provided with second and third projections for similarly supporting the mirror surface at two points in width direction thereof. First biasing means biases the mirror surface toward the first projection and second biasing means biases the mirror surface toward the second and third projections. Thus, the holding members support opposite ends of the mirror in a biased manner at a total of three points. However, all three points or projections act on the same surface of the mirror, and the direction of bias by the first biasing means is the same as that by the second biasing means. As a result, the problem occurs that the mirror is apt to be shifted in position by shocks caused by stopping and starting of driving of the optical system.

In addition, for example in the above described holding device for the fourth mirror, the mirror holding members for holding opposite longitudinal ends of the mirror are separately arranged so as to be changeable in posture around an axis parallel to an axis of rotation of the photoreceptor. This enables the position of a latent image on the surface of the photoreceptor to be regulated in a direction of rotation of the photoreceptor by changing the angle of reflection of the fourth mirror. However, it is remarkably difficult to separately change the posture of the mirror holding members without disturbing the balance of resolution of the image in a direction parallel to the axis of rotation of the photoreceptor. Also, the position of changing the reflecting angle of the fourth mirror is spaced from the mirror. Thus, a disadvantage has occurred in that the length of an optical path is changed substantially by regulation of the reflecting angle. Therefore, it is difficult to form the latent image on the surface of the photoreceptor at a predetermined magnification.

As shown in FIG. 11, in a conventional arrangement a movable frame member 62 has a sliding member 63 connected to member 62 by an eccentric cam 61, so that the height of sliding member 63 may be regulated up and down to correct a misaligned image due to error in parallelism of a mirror to a manuscript surface. The height from the sliding member 63 to movable frame member 62 is regulated by eccentric cam 61 in a case where the sliding member 63 becomes worn such that the mirror then is not parallel to the manuscript surface.

However, in such construction, upon loosening a screw member 64 in order to regulate the height, the movable frame member 62 will rotate around a guide rod 65 due to its own weight. Thus, during a height regulation operation, the height on the end of the movable frame member 62 must be held relative to guide rod 65 as a fulcrum, and screw member 64 must be tightened while maintaining such holding. However, it is almost impossible to fasten the screw member 64 while maintaining movable frame member 62 perfectly stationary at a precise regulated height. Thus, the operation of fastening or tightening the screw member 64 has been conducted as an approximation while taking into account up and down movement of the movable frame member 62 that inevitably occurs while attempting fastening of the screw member 64. However, it is no exaggeration to say that such manner of regulating the height is very rarely completed by one such operation, and thus disadvantages have occurred in that not only must such troublesome operation be repeated, but also precise regulation is remarkably difficult to achieve. In addition, since this manner of height regulation generally has been conducted by means of the cam and the like in the above described manner, the disadvantage exists that such separate regulating member must be added.

SUMMARY OF THE INVENTION

It is a first object of the present invention to provide a mirror holding device capable of effectively preventing shifting the position of a mirror due to shocks by a simple change of the form of support of the mirror.

It is a second object of the present invention to provide a mirror holding device with which the mirror may be used to form a latent image at a predetermined magnification on a surface of a photoreceptor without disturbing a balance of resolution of the image.

It is a third object of the present invention to provide a mirror holding device capable of easily and reasonably correcting a strain or misalignment of an image and of a remarkably simple construction.

In order to achieve the first object according to the present invention, a manuscript scanning apparatus adapted to guide a manuscript image to an image receptor through mirrors, includes a mirror holding device in the form of a first holding member holding one end of a mirror and provided with a first projection for supporting one side surface of the mirror at one point midway in a direction of the width thereof, and a second holding member holding the other end of the mirror and provided with second and third projections for supporting the other side surface of the mirror at two points in the direction of the mirror width. First biasing means biases the one end of the one side surface of the mirror toward said first projection. Second biasing means biases the other end of the other side surface of the mirror toward the second and third projections.

In order to achieve the second object according to the present invention, one of the second projection or the third projection is adapted to be shiftable in position in a direction of biasing of the second biasing means.

In order to achieve said third object according to the present invention, first and second optical travelling members are carried on a guide rail by respective sliding members at respective first ends of the travelling members, and such travelling members are slidably engaged at respective second ends thereof with a guide rod. The travelling members support plural mirrors. A holding member for at least one of the mirrors is provided with position regulating means for regulating an installing position of the mirror in a direction of biasing by biasing means.

According to the first aspect of the invention, opposite side surfaces of the mirror are biased toward respective projections. Thus, shocks that occur during reciprocal travelling of the optical system can be effectively absorbed, and accordingly shifting of the position of the mirror can be prevented.

According to the second aspect of the invention, a change of position of only one projection at the longitudinal end of the mirror that is supported at two points relative to the direction biasing of the second biasing means results in change of the reflecting angle of the mirror by movement thereof around the first projection at the opposite end of the mirror.

According to the third aspect of the invention, when the sliding member becomes worn after a long period of use such that the adjacent end of the movable frame member lowers, thereby tending to generate a misalignment of the image, such misalignment can be corrected by regulating the positions of the plural mirrors in the energizing directions of the first energizing means by means of the position regulating means.

BRIEF DESCRIPTION OF THE DRAWINGS

FIGS. 5a and 5b are partial sectional views showing holding devices for holding a second mirror;

FIG. 6 is a partial sectional view showing a mirror holding device one longitudinal end of the fourth mirror;

FIG. 7 is a view showing a mirror holding device the opposite longitudinal end of the fourth mirror;

FIG. 8 is a sectional view showing installation of a biasing means at the one end of the fourth mirror;

DESCRIPTION OF THE PREFERRED EMBODIMENTS

Preferred embodiments of the present invention will be described below with reference to the drawings.

Figure 1:
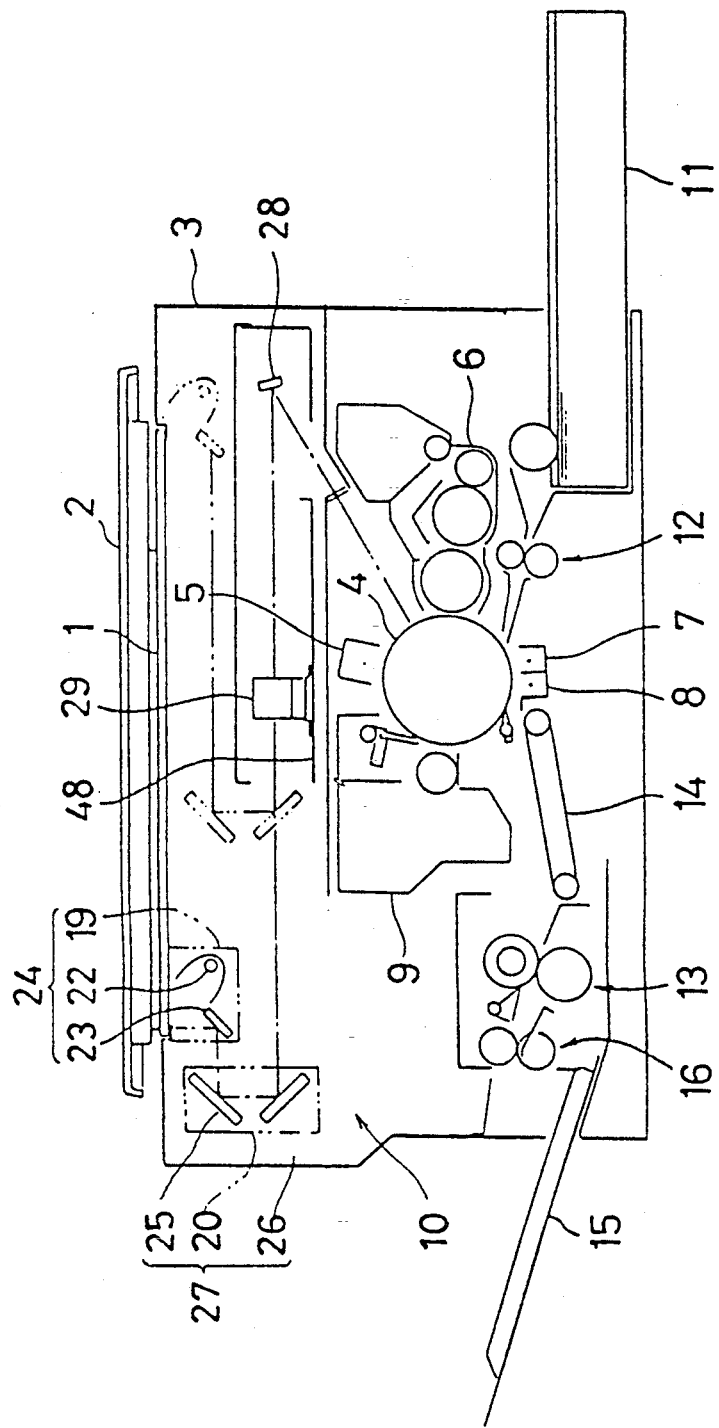
FIG. 1 is a schematic longitudinally sectioned side view showing an image forming apparatus.

FIG. 1 shows an electrostatic photographic copying machine as one example of an image forming apparatus and including a manuscript table a copying machine body 3 provided with a manuscript weight 2 thereon, a photoreceptor (image receptor) 4 within copying machine body 3. A charging device 5, a developing device 6, a transfer device 7, a paper separating device 8 and a cleaning device 9 are arranged around photoreceptor 4. An optical system movement-type manuscript scanning apparatus 10 is provided in a space below manuscript table 1. A supplied paper conveying device 12 conveys papers from a cassette case 11 to transfer device 7. A discharged paper conveying device 14 conveys separated papers to a fixing device 13. A pair of discharging rollers 16 discharge fixed papers to a tray 15.

Figure 2:
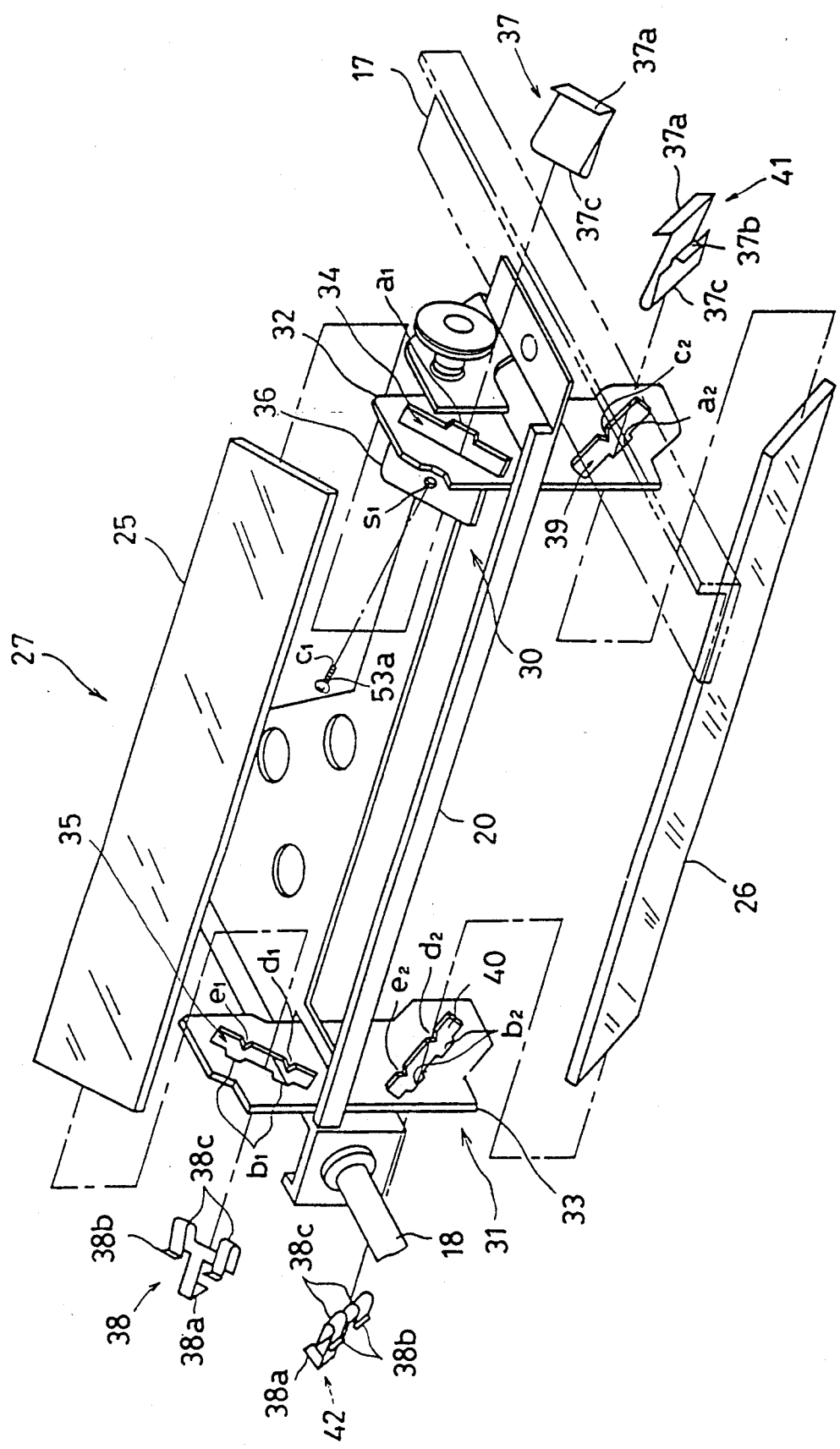
FIG. 2 is an exploded perspective view showing a second optical travelling member.
Figure 3:
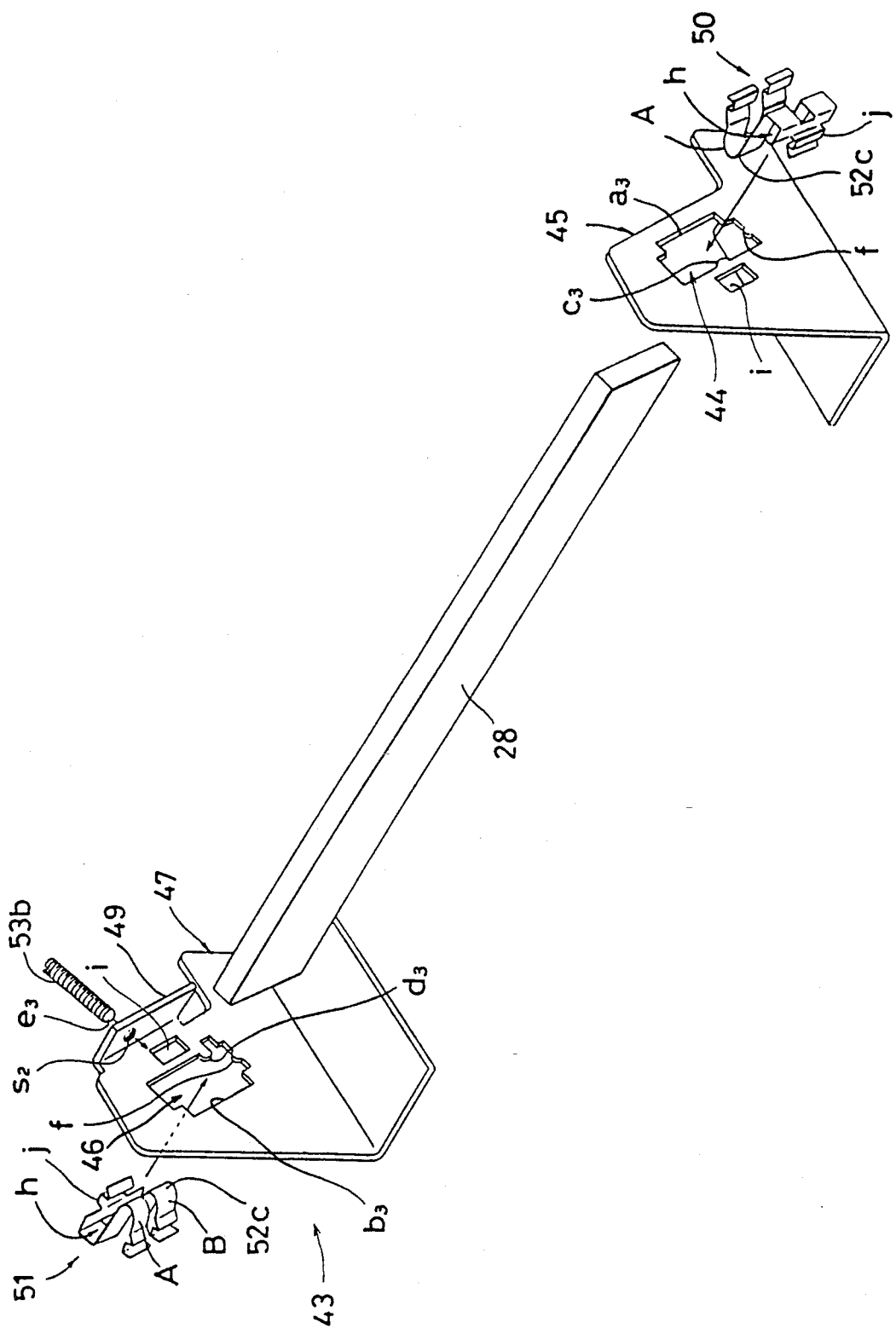
FIG. 3 is an exploded perspective view showing a holding device for a fourth mirror.
Figure 4:
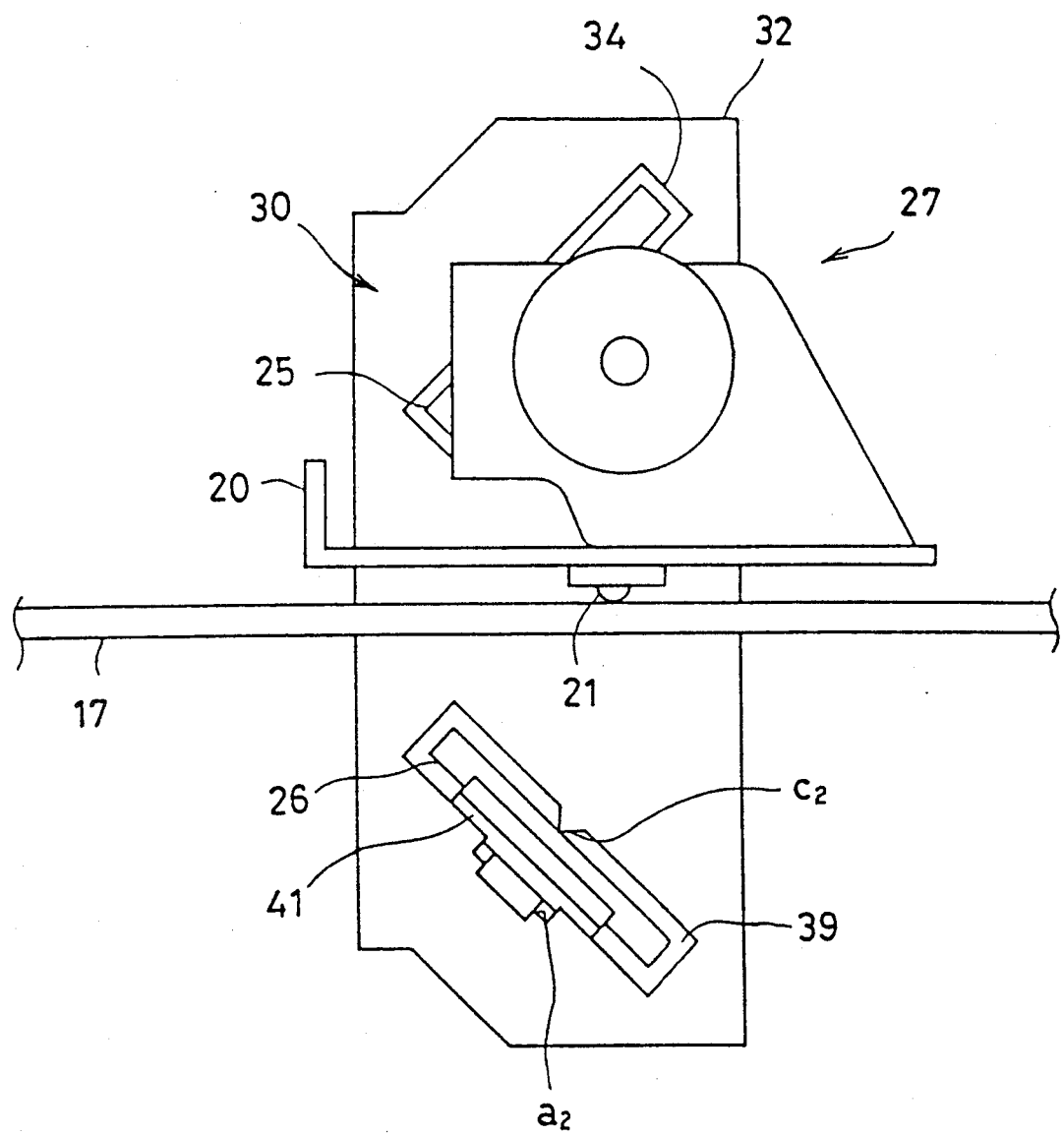
FIG. 4 is a side view showing the second optical travelling member.

Manuscript scanning apparatus 10 has the following construction. That is to say, as shown in FIG. 2 and FIG. 4, a guide rail 17 and a guide rod 18 extending in an image scanning direction are provided in a lower side of the manuscript table 1 and are spaced by an appointed interval. A first movable frame member 19 (FIG. 1) and a second movable frame member 20 each are provided with a sliding member 21 made of a material having a low coefficient of friction, such as a fluorine resin. Each sliding member 21 is at an end of the respective frame member adjacent guide rail 17 and slides thereon. The other end of each frame member slidably engages guide rod 18. First movable frame member 19 is provided with a light source 22 for radiating a manuscript on the manuscript table 1 and a first mirror 23 for reflecting light reflected by the manuscript table 1, thus forming a first optical travelling member 24. Second movable frame member 20 is provided with a second mirror 25 and a third mirror 26 for twice reflecting light reflected by first mirror 23, thus forming a second optical travelling member 27. A driving device (not shown) of known construction reciprocally moves first optical travelling member 24 in a manuscript scanning direction at a speed twice that of second optical travelling member 27. A fixed fourth mirror 28 reflects light reflected by third mirror 26 toward a surface of a photoreceptor after passage through an image forming lens unit 29 arranged midway of an optical path from third mirror 26 to fourth mirror 28.

A specific construction of a holding device 30 for second mirror 25 and a holding device 31 for third mirror 26 will be described with reference to FIGS. 2, 4 and 5.

Holding device 30 is as follows. Second movable frame member 20 supported by guide rod 18 and by guide rail 17 via sliding member 21 is provided at opposite ends thereof with a holding member 32 and a holding member 33, respectively, mounted so as to be movable upwardly and downwardly therethrough. Upper portions of member 32 and holding member 33 are provided with respective mirror receiving holes 34, 35 that are elongated and inclined by an appointed angle (for example 45°). Hole 34 includes an engaging portion $a_1$ formed by a notch or recess in an edge of hole 34 to face a mirror surface of mirror 25. Hole 35 includes two engaging portions $b_1$ formed by notches or recesses spaced in an edge of hole 35 to face a back side surface of mirror 25. A bracket 36 extends from member 32 to extend along the back side surface of mirror 25. Bracket 36 has therethrough a tapped hole $s_1$ defining a center axis extending perpendicular to the back side surface of mirror 25. A screw member (one example of a position regulating means) 53a is screwed into hole $s_1$ and defines a first projection $c_1$ to support the back side surface of the mirror 25 at one point midway in the direction of the width thereof. Screw member 53a may be adjusted to advance and retreat toward and away from mirror 25. Hole 35 has at an edge thereof opposite portions $b_1$ a second projection $d_1$ and a third projection $e_1$ at two points spaced along such edge and to face the mirror surface of the mirror 25. A first biasing member 37 biases one end of the second mirror 25 toward first projection $c_1$, and a second biasing member 38 biases the opposite end of the second mirror 25 toward second projection $d_1$ and third projection $e_1$. Member 37 is arranged between the mirror surface of second mirror 25 and engaging portion $a_1$, and member 38 is arranged between the back side surface of mirror 25 and engaging portions $b_1$. Thus, mirror 25 is supported resiliently at opposite ends thereof at a total of three points by first biasing member 37 and second biasing member 38 acting in opposite biasing directions.

Holding device 31 of the third mirror 26 has a similar structure. The lower portions of holding members 32 and 33 have therethrough respective holes 39 and 40 for receiving respective opposite ends of third mirror 26. Holes 39 and 40 are elongated and inclined by an appointed angle (for example 45°). Hole 39 includes an engaging portion $a_2$ formed by a notch in an edge of hole 39 to face a back side surface of mirror 26. Hole 40 includes two engaging portions $b_2$ formed by notches spaced in an edge of hole 40 to face the back side surface of mirror 26. Opposite edges of holes 39, 40 have extending therefrom a first projection $c_2$ and second and third projections $d_2$, $e_2$, respectively, opposite portion $a_2$ and portions $b_2$, respectively. First biasing member 41 is positioned between portion $a_2$ and the mirror 26 and biases mirror 26 toward first projection $c_2$. Second biasing member 42 is positioned between portions $b_2$ and mirror 26 and biases mirror 26 toward second and third projections $d_2$, $e_2$. Thus, opposite ends of mirror 26 are resiliently supported at a total of three points. As illustrated, biasing members 41, 42 act in the same direction, but could operate in opposite directions as in the arrangement of holding device 30 discussed above and illustrated.

Also, a mirror holding device of first optical travelling member 24 can have the same construction as the mirror holding device 31 of the third mirror 26 of the second optical travelling member 27, and thus a detailed description thereof is omitted.

The biasing members 37, 38, 41, 42 of the above described second and third mirror holding devices 30, 31 each is composed of a compression spring member made of a piece of spring plate. The biasing member 37 for biasing one end of the second mirror 25 toward the first projection $c_1$ comprises a mirror engaging portion or member 37a to be engaged with an end edge of mirror 25 to regulate an amount of insertion of member 37 into the hole 34, an engaging portion or member 36b to be engaged with the side of member 32 adjacent engaging portion $a_1$, and resilient biasing portion 37c to be inserted into hole 34-portion $a_1$ to engage with the mirror surface of mirror 25 to press mirror 25 against the first projection $c_1$, as shown in FIGS. 2 and 5b. Also, the biasing member 41 for biasing one end of the third mirror 26 toward the projection $c_2$ has a similar construction. Thus, the same constituent portions thereof are denoted by the same reference numerals and separate description thereof is omitted. The biasing member 38 for biasing the other end of the second mirror 25 toward the second and third projections $d_1$, $e_1$ comprises a mirror engaging portion 38a to be engaged with an en edge of mirror 25 for regulating an amount of insertion of member 38 into the hole 35, engaging portions 38b to be engaged with the side of member 33 adjacent portions $b_1$, and resilient biasing portions 38c to be inserted into hole 35-portions $b_1$ and to engage with the back side surface of mirror 25 to press the mirror 25 against the second projection $d_1$ and the third projection $e_1$, as shown in FIGS. 2 and 5a. The biasing member 42 for biasing the other end of the third mirror 26 toward the second and third projections $d_2$, $e_2$ has a similar construction. Thus, the same constituent portions are denoted by the same reference numerals and separate description thereof is omitted.

A specific construction of a holding device 43 for fourth mirror 28 will be described below in detail with reference to FIGS. 3, 6, 7, 8. Holding device 43 includes an L-shaped first holding member 45 having therethrough a hole 44 into which is to be inserted one end of the fourth mirror 28, and an L-shaped second holding member 47 having therethrough a hole 46 into which is to be inserted the opposite end of the mirror 28. Members 45, 47 are fixedly mounted on a base 48 on a side of the apparatus body by screwing, spot welding or the like. Hole 44 includes an engaging portion $a_3$ formed by a notch formed in an edge of hole 44 to face a back side surface of mirror 28. Hole 46 includes an engaging portion $b_3$ formed by a notch formed in an edge portion of hole 46 to face a mirror surface of the mirror 28. A first projection $c_3$ extends from an edge of hole 44 opposite portion $a_3$ to face the mirror surface mirror 28. A second projection $d_3$ to support a back side surface of mirror 28 extends from a lower portion of an edge of hole 46 opposite portion $b_3$. Mirror supporting projections f extend from lower edges of holes 44, 46 at positions to support a lower edge of mirror 28 at a mid portion in the direction of thickness thereof. A bracket 49 is connected with the second holding member 47 to extend along the back side surface of mirror 28. Bracket 49 has therethrough a tapped hole $s_2$ defining a center axis extending perpendicular to the back side surface of the mirror. A screw member 53b defines a third projection $e_3$ for supporting the back side surface of mirror 28 at a point spaced in the width direction thereof from projection $d_3$. Member 53b is threaded or screwed into tapped hole $s_2$ in a direction to abut the back side surface of mirror 28 and to be advanced and retreated therein in directions relative to a biasing member 51. A first biasing member 50 biases one end of mirror 28 toward said first projection $c_3$ and is positioned between mirror 28 and engaging portion $a_3$. Second biasing member 51 biases the opposite end of mirror 28 toward second and third projections $d_3$, $e_3$ and is positioned between mirror 28 and engaging portion $b_3$. Biasing members 50, 51 resiliently support the opposite ends of mirror 28 at a total of three points and act in opposite biasing directions.

According to the above described construction, each of the first to fourth mirrors 23, 25, 26, 28 is supported at three points and opposite ends are biased toward respective projections, so that shocks occurring during reciprocal movement of the optical system can be effectively absorbed and thus shifting of position of the respective mirror 23, 25, 26, 28 can be prevented from occurring.

Figure 9:
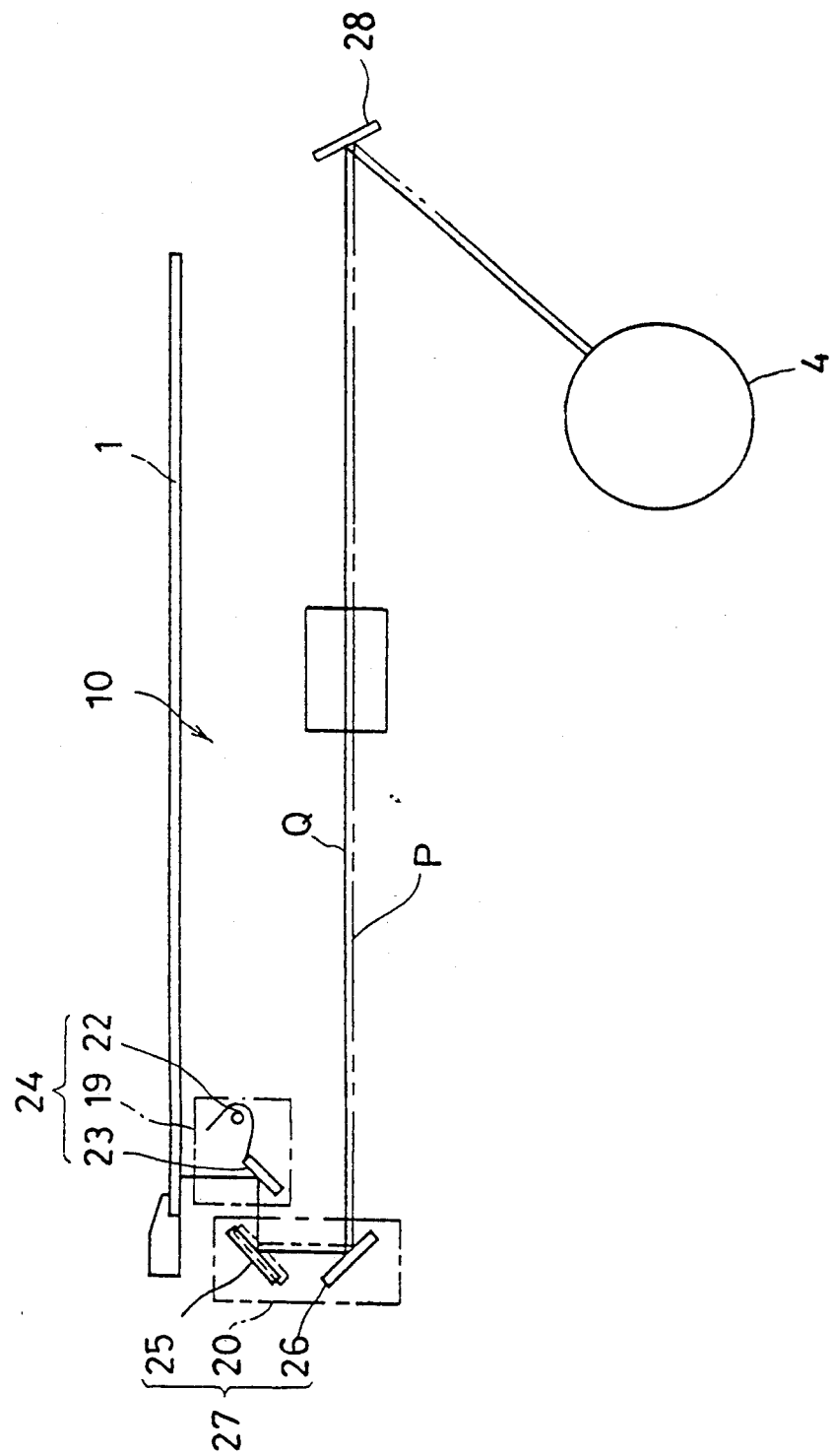
FIG. 9 is a schematic view showing an optical system of a manuscript scanning apparatus.

When the sliding member 21 of optical travelling member 27 carried on the guide rail 17 becomes worn after a long period of use such that the respective end of member 27 lowers due to a light beam reflected by mirrors 25, 26 will shift its own weight, shown by beam P indicated in FIG. 9. The result is a misaligned image on receptor 4. To correct this problem, screw member 53a supporting the respective end of the second mirror 25 at one point is rotated to move projection $c_1$ upwardly and thereby regulate upwardly the height of the respective end of mirror 25. Beam P thus is shifted in position to the position of original beam Q, shown by full lines in FIG. 9.

Figure 10:
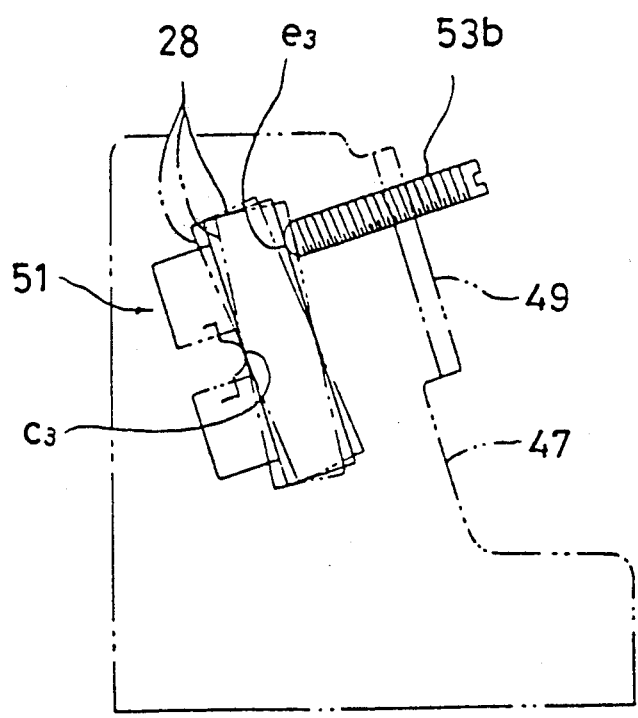
FIG. 10 is a diagram showing a manner of change of reflecting angle of the fourth mirror.
Figure 11:
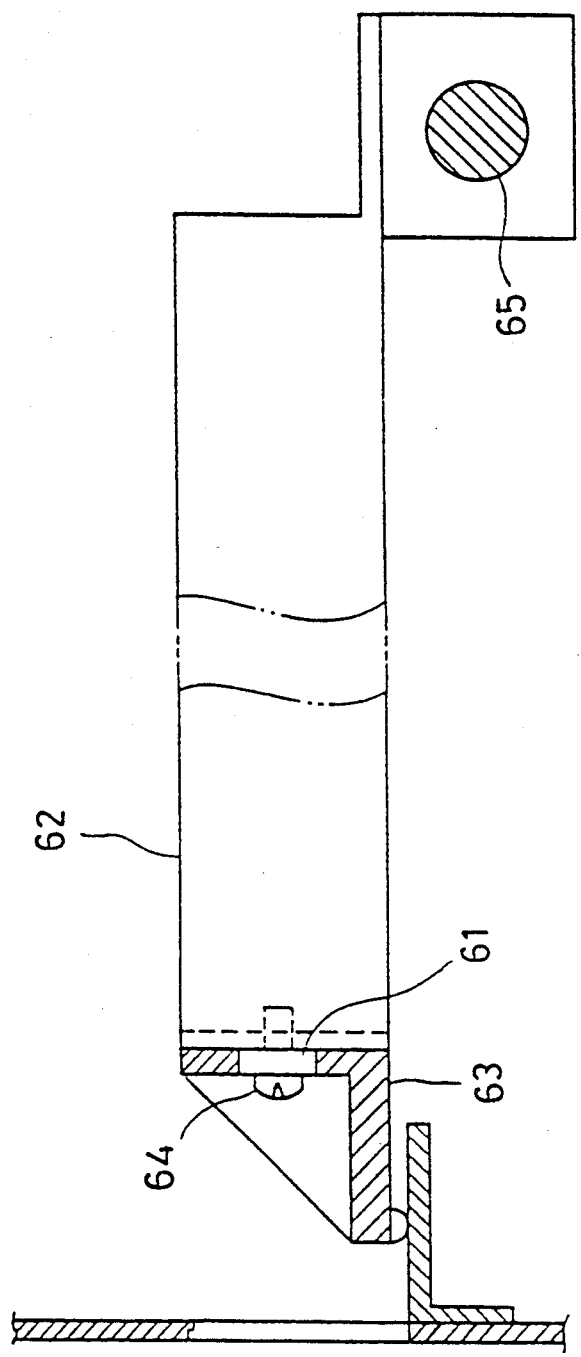
FIG. 11 is a partial sectional view showing construction of a conventional optical travelling member.

Also, during assembly and maintenance of the optical system, as shown in FIG. 10 screw member 53b is rotated to change a degree of projection of the third projection $e_3$, such that the position of the upper portion of the respective end of the fourth mirror 28 is moved in the biasing direction of the biasing member 51. Thereby, the reflecting angle of the fourth mirror 28 is changed by pivoting of the mirror about the first projection $c_3$. That is to say, the angle of reflection of a point of a light incident on the mirror 28 as seen in the longitudinal direction of the mirror 28 is changed. Thus, a latent image of superior resolution and having an intended magnification can be formed on the surface of the photoreceptor. Such is achieved without disruption of a balance of resolution in the direction parallel to the axis of rotation of the photoreceptor 4 but also without substantial change of the optical length of the path from lens unit 29 to the surface of the photoreceptor.

In addition, since the bottom edge of the mirror 28 is supported at one point by each projection f, even though the reflecting angle of the mirror 28 is repeatedly changed, upward movement of the mirror 28 and the breakage of the bottom edge thereof can be effectively prevented. That is to say, if the bottom edge of the mirror 28 was supported by flat edge portions of the holes 44, 46, then during angle adjustment the edge on the back side surface of the mirror would be raised from such flat edge portions around the mirror edge on the mirror side surface thereof. At such occurrence, not only is there the possibility that an excessive stress is imparted to the mirror edge on the mirror side surface, thus causing breakage thereof, but also a disadvantage occurs in that the entire bottom side of the mirror will be raised when the mirror 28 is moved in a return direction around the first projection $c_3$ in order to regulate the angle of reflection when the mirror edge on the back side surface of the mirror rises from the flat edge portions.

However, according to the present invention, the bottom edge of the mirror is supported at one point by means of each projection f, and the third projection $e_3$ on the side apart from the projection f is adapted to be changeable in position in the biasing direction of the biasing member 51. Thus, rising movement of the mirror 28 and the breakage of the lower edge thereof are effectively prevented.

The first and second biasing members 50, 51 of the fourth mirror holding device 43 all are compression spring members made of a spring plate. That is to say, as shown in FIGS. 3, 6, 7, 8, a piece of spring plate 52 is bent twice by, for example, 90° and 95° in the same direction to form a tapered mirror holding portion h having legs or portions that diverge under a non-stressed or free condition. One spring plate portion or leg 52a forming portion h includes a first stopper j to be engaged through an opening or a hole i formed in the respective holding member 45, 47 and to grasp an edge of such member. A pointed or free end of spring plate portion 52a is inclined outwardly so that such free end easily may be inserted through hole i and so that the mirror 28 may be inserted easily into the mirror holding portion h. The other spring plate portion or leg 52b forming the mirror holding portion h is bent backwardly into substantially a U-shape to impart a springy or resilient property. Spring plate portion 52b is provided with projections m, n bent to project outwardly at a midway position portion and at a free end position thereof, respectively, to form a second stopper r to engage the member edges defining engaging portions $a_3$, $b_3$. In addition, the almost U-shaped portion 52c is partially divided by a slit t into two portions A, B spaced in the direction of width of the mirror 28. In member 51, portions A, B are aligned with projections $e_3$, $d_3$, respectively, as shown in FIG. 6. In member 50, projection $c_3$ is aligned with slit 6, as shown in FIG. 7.

With the biasing members 50, 51 having the above described construction, the installation of the fourth mirror 28 on the first and second holding members 45, 47 is conducted in, for example, the following manner. First, the U-shaped portion 52c of the biasing member 50 is inserted from outwardly into the hole 44 of the holding member 45, with portion 52c positioned on the side opposite projection $c_3$, such that stopper j of member 50 engages the edge of the hole i, and such that at the same time the stopper r engages the edge defining portion $a_3$ opposite projection $c_3$. Thereby, member 50 is installed on the first holding member 56. Next, one longitudinal end of mirror 28 is inserted into mirror holding portion h of member 50 such that portion 52c bears on the back side surface of mirror 28 and urges the mirror side surface of the mirror 28 toward the projection $c_3$. Then, the U-shaped portion 52c of the biasing member 51 is inserted from the outside into the hole 46 of the second holding member 47, such that the U-shaped portion 52c is positioned in portion $b_3$ and the other longitudinal end of the mirror 28 is inserted into the mirror holding portion h. Stopper j of member 51 engages the edge of the hole i in the vicinity of the second projection $d_3$, and at the same time the stopper r is engaged with the edge defining portion $b_3$ of hole 46. Portion 52c resiliently engages the mirror side surface of mirror 28 an urges the back side surface thereof toward the projections $d_3$, $e_3$.

U-shaped portion 52c of member 51 urges the mirror into engagement with two points, that is the projections $d_3$, $e_3$. When the projection $e_3$ is shifted in position against the biasing force of the member 51 to change the angle of the mirror 28, stress also is transmitted to the portion of member 51 corresponding to the second projection $d_3$. As a result, the mirror 28 is apt to tend to be moved away from the projection $d_3$, with the result that the angle of the mirror 28 would not be regulated in the intended manner. To avoid such problems, the spring constant of the spring plate 562 could be reduced to such that transmitted stress would not cause movement away from projection $d_3$. Such solution however would result in the disadvantage that the position of the mirror 28 easily could be shifted by vibrations of a machine body. In addition, biasing member 51 could be constructed as members spaced from each other to bias mirror 28 individually toward the respective projections $d_3$, $e_3$, thereby preventing the above problem of the mirror 28 moving away from the projection $d_3$. However, with such construction, disadvantages would occur in that not only is the number of parts forming member 51 increased with a resultant cost increase, but also the operation assembling small size members in a narrow space is difficult and reduces productivity. The above problems are avoided according to the present invention by the provision of slit t forming spaced biasing portions A, B. Accordingly, biasing of the mirror 28 toward the second and third projections $d_3$, $e_3$ is achieved separately by portions B, C. Therefore, when the projection $e_3$ is shifted in position in a direction against the biasing member 51 in order to change the reflecting angle of the mirror 28, the resultant stress is absorbed by the biasing portion A corresponding to projection $e_3$ and is not transmitted to the biasing portion B corresponding to the projection $d_3$. Thus, movement of the mirror 28 away from the projection $d_3$ effectively is prevented. Also, productivity and cost are favorable.

Biasing member 51 discussed above is made of a piece of spring plate 52. However, it also can be made of a rubber plate which may be, for example, partially divided at a portion corresponding to the first projection $c_3$. Thus, the biasing elements of the second biasing member 51 can be variously selected.

In addition, although the first and second biasing members 50, 51 have the same identical construction in the above preferred embodiment, member 50 may be a non-divided construction without slit t.

Further, although the screw member 53a of the first projection $c_1$ supporting one end of the second mirror 25 is screwed into the bracket 36 to form a mirror position regulating means in the preferred embodiment, such the mirror position regulating means may be provided for any one or all of the first mirror 23, the third mirror 26 and the fourth mirror 28.

Still further, although the third projection $e_3$ of the second holding member 47 supporting one end side of the fourth mirror 28 is adapted to be shifted in position in the biasing direction of the biasing member 51 in the preferred embodiment, the construction may be such that the second projection $d_3$ is adapted to be shifted in position in the biasing direction of the biasing member 51 may be selected. Also, the construction may be that one of the second and third projections $d_3$, $e_3$ is adapted to be shifted in position relative to the support of any one or all of the first mirror 23, the second mirror 25 and the third mirror 26.

As described above, according to one aspect of the invention, one side surface on one end and the opposite side surface of the opposite end of a mirror are adapted to be pressed against the projections by biasing forces acting in opposite directions, so that shocks occurring during reciprocal movement of an optical system can be effectively absorbed and shifting of the position of the mirror surely can be prevented.

According to a second aspect of the invention, the reflecting angle of a mirror can be changed by a simple operation without change of balance of resolution of magnification in the direction of an axis of rotation of a photoreceptor and without substantial change of an optical length related to a change of a latent image. Thus, merely one of two projections supporting an end side of the mirror at two points is shifted in position in a biasing direction of a biasing means.

According to a third aspect of the invention, distortion of an image, which can be generated when a sliding member becomes worn after a long period of use, effectively can be avoided by a simple operation of regulating the position of the side of the mirror supported by a guide rail that supports the sliding member.

We claim:

1. A mirror assembly for use in an apparatus for transmitting a manuscript image via plural mirrors to a receptor, said assembly including a mirror having first and second opposite ends and first and second opposite surfaces, and a holding device for mounting said mirror, said holding device comprising:
   a first holding member supporting said first end of said mirror and having a first projection directed toward said first surface of said mirror at a single point thereof located midway in a width dimension of said mirror;
   a second holding member supporting said second end of said mirror and having second and third projections directed toward said second surface of said mirror at two respective points spaced in said width dimension of said mirror;
   a first biasing device positioned to bias said first end of said mirror toward said first projection; and
   a second biasing device positioned to bias said second end of said mirror toward said second and third projections.

2. An assembly as claimed in claim 1, wherein said first biasing device urges said first surface of said mirror into contact with said first projection, and said second biasing device urges said second surface of said mirror into contact with said second and third projections.

3. An assembly as claimed in claim 1, wherein biasing forces of said first and second biasing devices are directed toward said mirror in opposite directions.

4. An assembly as claimed in claim 3, wherein said opposite directions are perpendicular to opposite of said surfaces.

5. An assembly as claimed in claim 1, wherein said first holding member has therethrough a first hole into which extends said first end of said mirror, and said second holding member has therethrough a second hole into which extends said second end of said mirror.

6. An assembly as claimed in claim 5, wherein said first projection extends into said first hole, and at least one of said second and third projections extends into said second hole.

7. An assembly as claimed in claim 6, wherein both said second and third projections extend into said second hole.

8. An assembly as claimed in claim 6, wherein said second projection extends into said second hole, and said third projection comprises a member mounted on a bracket on said second holding member and movable with respect thereto relative to a direction of biasing force of said second biasing device.

9. An assembly as claimed in claim 8, wherein said bracket has therethrough a tapped hole, and said member is threaded into said tapped hole and movable therein toward and away from said mirror.

10. An assembly as claimed in claim 5, wherein said second and third projections extend into said second hole, and said first projection comprises a member mounted on a bracket on said first holding member and movable with respect thereto relative to a direction of biasing force of said first biasing device.

11. An assembly as claimed in claim 10, wherein said bracket has therethrough a tapped hole, and said member is threaded into said tapped hole and movable therein toward and away from said mirror.

12. An assembly as claimed in claim 5, wherein said first hole includes, at an edge thereof opposite said first projection, a first engaging portion, and said first biasing device comprises a first spring member extending into said first engaging portion and acting between said edge and said second surface of said mirror to urge said first end of said mirror toward said first projection.

13. An assembly as claimed in claim 12, wherein said second hole includes, at an edge thereof opposite said second and third projections, at least one second engaging portion, and said second biasing device comprises a second spring member extending into said at least one second engaging portion and acting between said edge and said first surface of said mirror to urge said second end of said mirror toward said second and third projections.

14. An assembly as claimed in claim 13, comprising two said second engaging portions spaced along said edge of said second hole, and wherein said second spring member includes two spaced portions fitting into respective said two second engaging portions.

15. An assembly as claimed in claim 13, wherein each of said spring members comprises a compression spring formed of a bent spring plate material.

16. An assembly as claimed in claim 15, wherein each said compression spring is bent to a substantially U-shaped configuration including a compressed resilient portion acting between a respective said mirror surface and a respective said hole edge and having opposite legs with free ends.

17. An assembly as claimed in claim 16, wherein a first said free end of a first said leg includes a first engaging member engaging a respective said engaging portion of a respective said hole of a respective said holding member.

18. An assembly as claimed in claim 17, wherein said first engaging member comprises a bent portion abutting a side of said respective holding member.

19. An assembly as claimed in claim 17, wherein said first engaging member includes bent projections defining a stopper enclosing said edge of said respective engaging portion.

20. An assembly as claimed in claim 17, wherein a second said leg includes a second engaging member engaging a respective said end of said mirror.

21. An assembly as claimed in claim 20, wherein said second engaging member comprises a bent free end of said second leg engaging an edge of said respective mirror end.

22. An assembly as claimed in claim 20, wherein said second engaging member comprises a holding portion formed by double bending of said second leg and enclosing an edge of said respective mirror end.

23. An assembly as claimed in claim 22, wherein said holding portion includes a further leg having a free end having bent projections defining a stopper.

24. An assembly as claimed in claim 23, wherein said respective holding member has therethrough an opening adjacent the respective said projection or projections, and said further leg extends through said opening with said stopper enclosing an edge thereof.

25. An assembly as claimed in claim 17, wherein said first leg is divided by a slit to form two said first engaging members spaced by said slit.

26. An assembly as claimed in claim 5, wherein each said holding member includes a bottom projection extending upwardly from a bottom edge of the respective said hole, and a lower edge of said mirror rests on said bottom projections.

27. An assembly as claimed in claim 26, wherein each said bottom projection contacts said lower edge of said mirror at a respective single point midway of a thickness dimension of said mirror.

28. An assembly as claimed in claim 1, wherein one of said projections comprises a member mounted to be movable with respect to the respective said holding member in a direction relative to a direction of biasing force of the respective said biasing device.

29. An assembly as claimed in claim 28, wherein said member is mounted on a bracket on said respective holding member.

30. An assembly as claimed in claim 29, wherein said bracket has therethrough a tapped hole, and said member is threaded into said tapped hole and movable therein toward and away from said mirror.

31. An assembly as claimed in claim 28, wherein said one projection comprises said first projection.

32. An assembly as claimed in claim 28, wherein said one projection comprises one of said second and third projections.

33. An assembly as claimed in claim 1, wherein said first and second holding members are mounted on a travelling optical support member guided for reciprocal movement by a guide rod and a guide rail, and said optical support member includes a first end having a slidable member slidably supported by said guide rail and a second end slidably engaging said guide rod.

34. An assembly as claimed in claim 33, wherein said first holding member is mounted on said first end of said optical support member, and said second holding member is mounted on said second end of said optical support member.

35. An assembly as claimed in claim 34, wherein said first projection comprises a member mounted to be movable with respect to said first holding member in a direction relative to a direction of biasing force of said first biasing device.

36. An assembly as claimed in claim 35, wherein said member is mounted on a bracket on said first holding member.

37. An assembly as claimed in claim 36, wherein said bracket has therethrough a tapped hole, and said member is threaded into said tapped hole and movable therein toward and away from said mirror.

38. An assembly as claimed in claim 33, further comprising another mirror supported on said first and second holding members by further said biasing devices.

* * * * *